(12) United States Patent
Choi et al.

(10) Patent No.: US 8,414,018 B2
(45) Date of Patent: Apr. 9, 2013

(54) CENTER AIRBAG MODULE FOR VEHICLE

(75) Inventors: Jae Ho Choi, Seoul (KR); Hyeong Ho Choi, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/167,382

(22) Filed: Jun. 23, 2011

(65) Prior Publication Data

US 2012/0119475 A1    May 17, 2012

(30) Foreign Application Priority Data

Nov. 12, 2010   (KR) .................. 10-2010-0112641

(51) Int. Cl.
*B60R 21/214*  (2011.01)
*B60R 21/231*  (2011.01)
*B60R 21/233*  (2006.01)

(52) U.S. Cl.
USPC ....................... 280/730.1; 280/729

(58) Field of Classification Search ........... 280/730.1, 280/729, 730.2, 743.2, 728.1
See application file for complete search history.

(56) References Cited

U.S. PATENT DOCUMENTS

| | | | | |
|---|---|---|---|---|
| 5,172,790 A * | 12/1992 | Ishikawa et al. | ........... | 180/268 |
| 5,470,103 A * | 11/1995 | Vaillancourt et al. | ...... | 280/730.1 |
| 5,499,840 A * | 3/1996 | Nakano | ............. | 280/730.1 |
| 6,158,765 A * | 12/2000 | Sinnhuber | ............. | 280/728.3 |
| 6,773,026 B2 * | 8/2004 | Meyer | ............. | 280/729 |
| 6,786,505 B2 * | 9/2004 | Yoshida | ............. | 280/729 |
| 6,966,576 B1 * | 11/2005 | Greenstein | ............. | 280/730.1 |
| 7,222,877 B2 * | 5/2007 | Wipasuramonton et al. | ............. | 280/730.1 |
| 7,264,269 B2 * | 9/2007 | Gu et al. | ............. | 280/730.2 |
| 7,594,675 B2 * | 9/2009 | Bostrom et al. | ............. | 280/730.2 |
| 7,819,419 B2 * | 10/2010 | Hayashi et al. | ............. | 280/730.1 |
| 7,971,901 B2 * | 7/2011 | Tomitaka et al. | ............. | 280/730.2 |
| 7,976,058 B2 * | 7/2011 | Suzuki et al. | ............. | 280/729 |
| 8,210,566 B2 * | 7/2012 | Fukawatase et al. | ............. | 280/730.1 |
| 2001/0033072 A1 * | 10/2001 | Kumagai et al. | ............. | 280/730.1 |
| 2004/0124615 A1 * | 7/2004 | Tanase et al. | ............. | 280/730.2 |
| 2006/0103119 A1 * | 5/2006 | Kurimoto et al. | ............. | 280/730.2 |
| 2010/0237595 A1 * | 9/2010 | Fukuyama et al. | ............. | 280/730.2 |
| 2010/0264631 A1 * | 10/2010 | Tomitaka et al. | ............. | 280/730.2 |
| 2010/0283230 A1 * | 11/2010 | Tomitaka et al. | ............. | 280/730.2 |
| 2010/0295280 A1 * | 11/2010 | Tomitaka et al. | ............. | 280/730.1 |

FOREIGN PATENT DOCUMENTS

| | | |
|---|---|---|
| JP | 05-208647 | 8/1993 |
| JP | 2007-084014 (A) | 4/2007 |
| JP | 2010-076642 (A) | 4/2010 |

* cited by examiner

*Primary Examiner* — Drew Brown
(74) *Attorney, Agent, or Firm* — Morgan, Lewis & Bockius LLP

(57) ABSTRACT

A center airbag module for a vehicle, may include a center console provided between a pair of seats, and an airbag cushion provided in the center console to be deployed in the event of a side collision, and having a lower chamber configured to support a body of a passenger, and an upper chamber including a left chamber and a right chamber which fluid-branch from an upper end of the lower chamber and configured to protect a head of the passenger.

6 Claims, 8 Drawing Sheets

CENTER AIRBAG MODULE FOR VEHICLE

CROSS-REFERENCE TO RELATED APPLICATIONS

The present application claims priority to Korean Patent Application No. 10-2010-0112641 filed on Nov. 12, 2010, the entire contents of which is incorporated herein for all purposes by this reference.

BACKGROUND OF THE INVENTION

1. Field of the Invention

The present invention relates generally to center airbag modules for vehicles and, more particularly, to a center airbag module for a vehicle, which restrains the movement of a passenger towards a far side, when a vehicle collision occurs at the far side of the passenger, thus minimizing an injury to the passenger.

2. Description of Related Art

Generally, airbag systems for vehicles are a safety device that deploys an airbag cushion in the event of a vehicle collision to mitigate shocks and prevents a passenger from being thrown out of a vehicle body. The airbag systems are typically classified into a driver airbag (DAB) and a passenger airbag (PAB) for protecting passengers sitting in a front seat in the event of a head-on collision, a side airbag (SAB) for protecting the side of a passenger in the event of a side collision, and a curtain airbag (CAB).

A side airbag or center airbag for a vehicle may be installed in a center console of the vehicle so as to prevent the heads of neighboring passengers from colliding with each other or prevent a passenger from being moved towards a far side and colliding with objects in the interior when a side collision occurs at the far side of the passenger, thus preventing the passenger from being injured.

FIG. 1 is a view showing the movement of a passenger in the event of a side collision when a center airbag apparatus has not been installed.

If the center airbag apparatus is not installed in a vehicle, a passenger may be moved towards the far side by the abrupt shock in the event of a side collision. In this case, the passenger may collide with objects in the interior of the vehicle, or his or her head may collide with the head of a neighboring passenger, so that the passenger may be severely injured.

In order to solve the problem, the center airbag apparatus is installed in the vehicle.

FIG. 2 is a view showing a conventional center airbag apparatus.

The conventional center airbag apparatus has two different chambers 1a and 1b which are provided on opposite sides of a console box 1 and are deployed in a transverse direction of a vehicle. The center airbag apparatus is problematic in that it has two independent chambers 1a and 1b, so that its manufacturing cost and weight are increased. Further, since the chambers 1a and 1b provided on the opposite sides of the console box 1 are deployed in the transverse direction of the vehicle, it is impossible to minimize the movement of a passenger towards the far side in an empty space above the console box 1.

FIG. 3 shows another conventional center airbag apparatus. The center airbag apparatus is problematic in that it has a single chamber 3 and the support force of the chamber 3 is too large, so that a passenger's head is subjected to a large reaction force that bends it towards an opposite side.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a center airbag module for a vehicle, which uses a lower chamber and two upper chambers branching and extending from the lower chamber, thus minimizing the movement of a passenger towards a far side and an injury to the passenger in the event of a side collision.

In an aspect of the present invention, the center airbag module for a vehicle may include a center console provided between a pair of seats, and an airbag cushion provided in the center console to be deployed in the event of a side collision, and including a lower chamber configured to support a body of a passenger, and an upper chamber including a left chamber and a right chamber which fluid-branch from an upper end of the lower chamber and configured to protect a head of the passenger.

Each of the left and right chambers may be deployed while being spaced apart from a corresponding seat by a predetermined distance.

A predetermined space may be formed between the left and right chambers to absorb a shock.

A width of the lower chamber may be smaller than a width of the upper chamber, wherein facing inner surfaces of the lower chamber may be partially connected to each other by a tether or by sewing to form a fluid communication to the upper chamber.

Upper ends of the left and right chambers may be connected to each other by sewing along a first seam or by a tether.

The upper and lower chambers may be separated from each other by a second seam or a tether.

In another aspect of the present invention, a center airbag module for a vehicle may include a center console provided behind an armrest, and placed between a pair of seats, a surface of the center console being curved, and an airbag cushion provided in the center console to be deployed in the event of a side collision, and having a lower chamber configured to support a passenger's body, and an upper chamber extending from an upper end of the lower chamber and configured to protect the passenger's head, wherein the airbag cushion, after deployment thereof, may be fitted between a roof of the vehicle and the curved surface of the center console to be subjected to a force applied thereto, thus supporting a lateral movement of the passenger.

The upper chamber includes left and right chambers that fluid-branch from the upper end of the lower chamber, wherein upper ends of the left and right chambers may be connected to each other by sewing along a first seam or by a tether.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
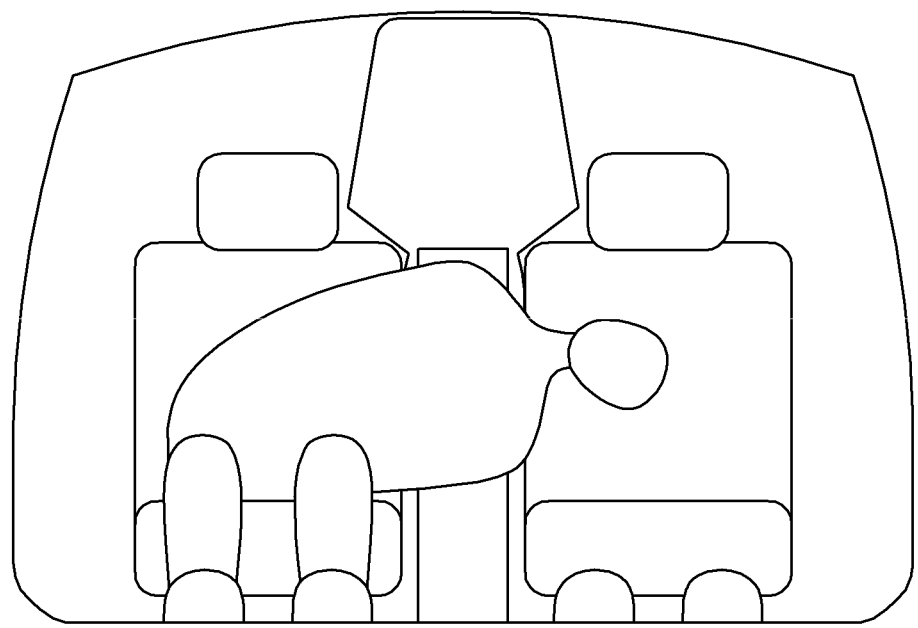
FIG. 1 is a view showing the movement of a passenger in the event of a side collision when a center airbag apparatus has not been installed.
Figure 2:
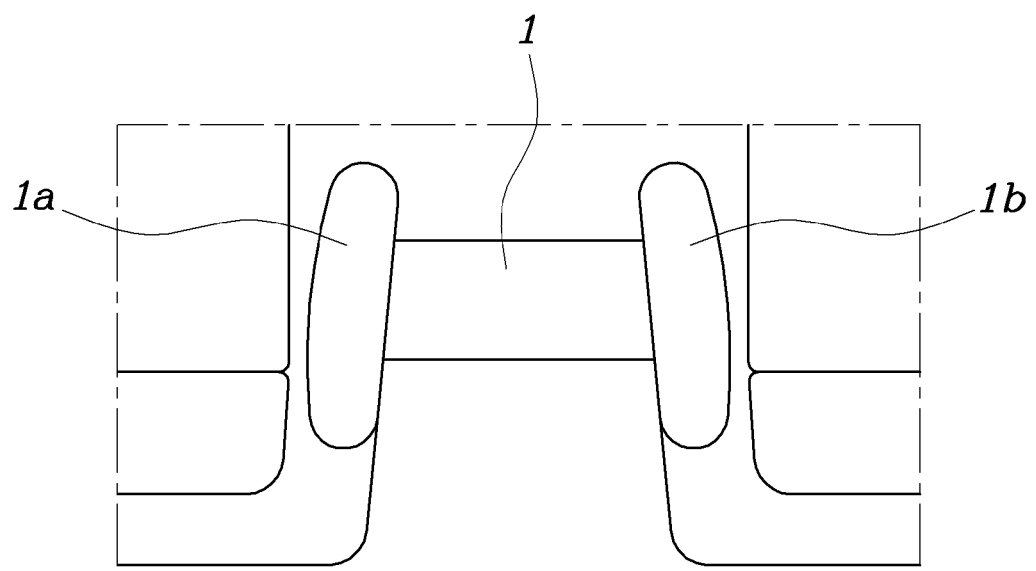
FIG. 2 is a view showing a conventional center airbag apparatus for a vehicle.
Figure 3:
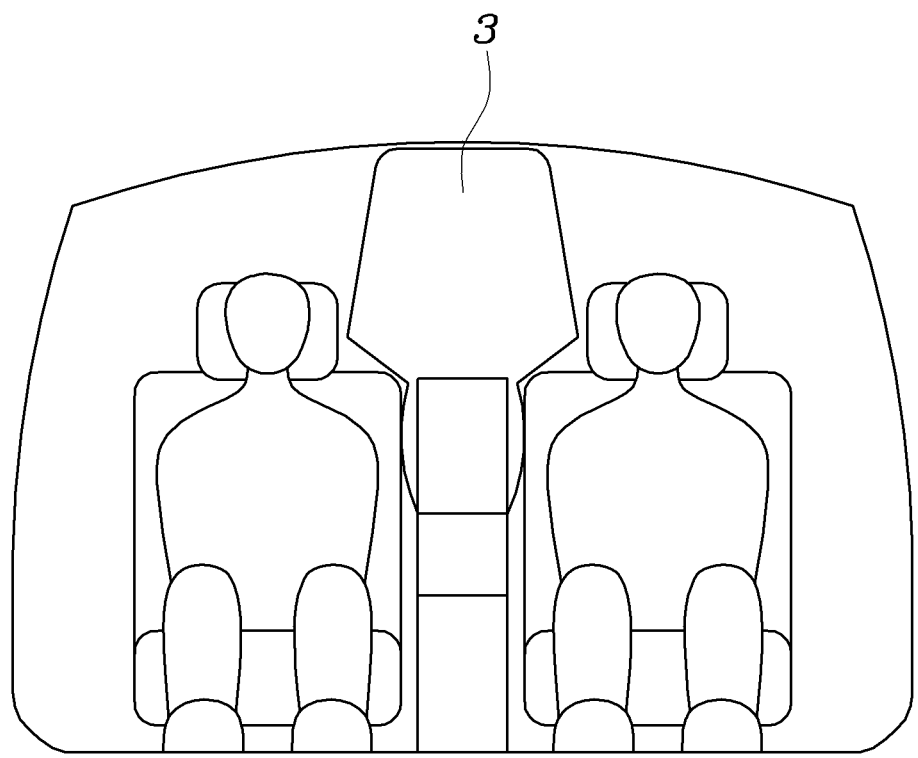
FIG. 3 is a view showing another conventional center airbag apparatus for a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a center airbag module for a vehicle according to the exemplary embodiment of the present invention will be described with reference to the accompanying drawings.

Figure 4:
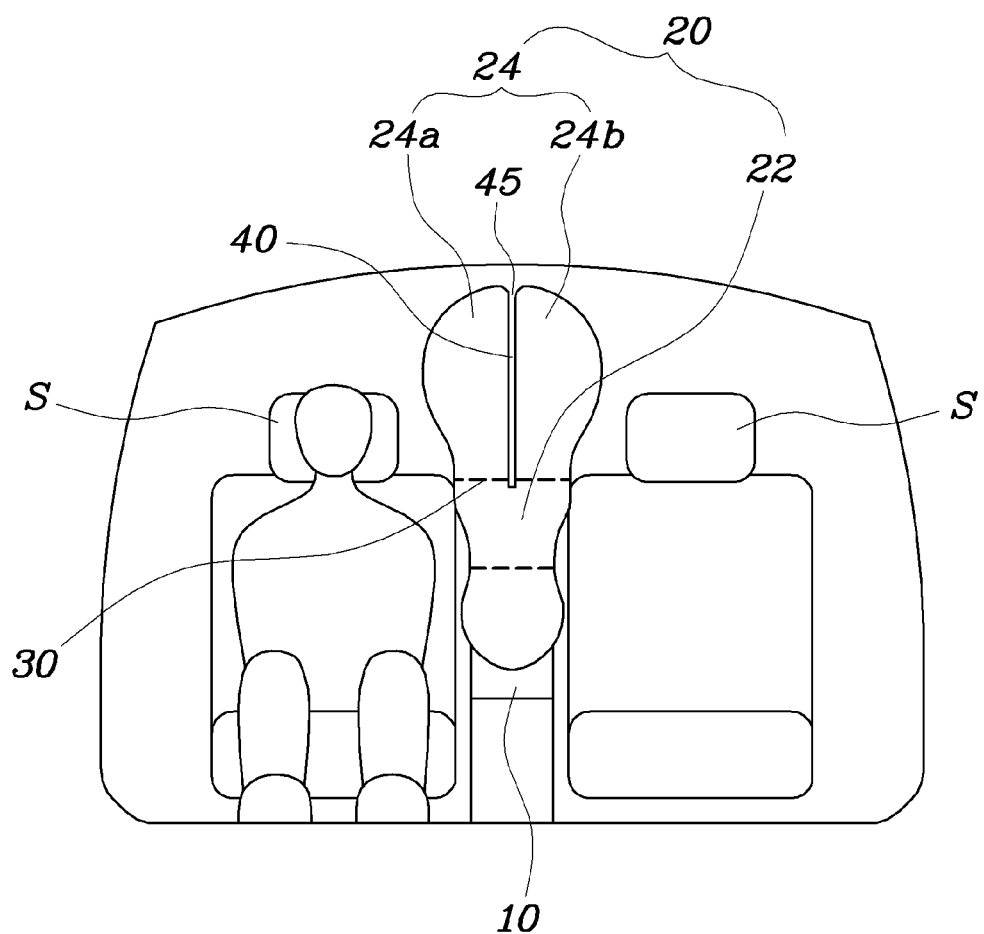
FIG. 4 is a front view showing a center airbag module for a vehicle according to an exemplary embodiment of the present invention.

As shown in FIG. 4, a center airbag module for a vehicle according to an exemplary embodiment of the present invention includes a center console 10 and an airbag cushion 20.

The center console 10 is installed between a pair of seats S. The airbag cushion 20 is provided in the center console 10. Thus, if a side collision occurs, the airbag cushion 20 is inflated and deployed from the upper end of the center console 10, thus preventing a passenger from being moved towards a far side.

The airbag cushion 20 includes a lower chamber 22 and an upper chamber 24. Further, the upper chamber 24 includes a left chamber 24a and a right chamber 24b. The airbag cushion 20 has the structure of 2+1 on the whole.

The lower chamber 22 is the part that supports a passenger's body (the arms, shoulders, etc.) when he or she is moved towards the far side, while the upper chamber 24 is the part that supports the passenger's head. The upper chamber 24 extends upwards from the lower chamber 22, and branches from the upper end of the lower chamber 22 into the left chamber 24a and the right chamber 24b. In order to maximize the effect of protecting the passenger's head, it is preferable that the left and right chambers 24a and 24b be symmetrical with respect to each other.

Preferably, each of the left and right chambers 24a and 24b is deployed while being spaced apart from a corresponding seat S by a predetermined interval. Such an interval serves to minimize reaction force when a passenger collides with the left or right chamber 24a or 24b, thus preventing the passenger from being catapulted in an opposite direction. That is, if the passenger collides with the left or right chamber 24a or 24b in the state in which there is no space between the left and right chambers 24a and 24b and the seats S, the passenger may be catapulted in the opposite direction by the reaction force. In order to absorb the reaction force, a predetermined distance is provided between each of the left and right chambers 24a and 24b and the corresponding seat S.

In order to further reduce the reaction force and maximize the head support function of the upper chamber 24, the left and right chambers 24a and 24b are preferably spaced apart from each other by a gap 40. The gap 40 between the left and right chambers 24a and 24b allows the airbag cushion 20 to more effectively perform its function. Thus, the upper chamber 24 divided into two parts can minimize shocks transmitted to the passenger's head.

It is preferable that the width of the lower chamber 22 be smaller than that of the upper chamber 24. The most fatal injury to the passenger in the event of a side collision is a head injury. Thus, the airbag cushion 20 must be manufactured to have a shape corresponding to the profile of the passenger, thus achieving the maximum effect. If the side surface of the airbag cushion 20 is a plane, the passenger's body (the arms, shoulders, etc.) comes into contact with the airbag cushion 20. By the reaction force generated in the event this happens, the passenger's head is subjected to a secondary shock, so that the head cannot be sufficiently protected. Thus, in order to minimize the injury to the passenger, the head and body (the arms, shoulders, etc.) of the passenger must simultaneously come into contact with the airbag cushion 20. Such an effect can be obtained when the width of the lower chamber 22 is smaller than that of the upper chamber 24.

If the facing inner surfaces of the lower chamber 22 are connected by a tether 30, it is easier to form the lower chamber 22 such that its width is smaller than that of the upper chamber 24. The width of the lower chamber 22 may also be adjusted by adjusting the length of the tether 30.

The upper ends of the left and right chambers 24a and 24b are preferably sewn by a first seam 45. In order to minimize shocks transmitted to the passenger's head by dividing the upper chamber 24 into the left and right chambers 24a and 24b, a maximum contact surface must be provided between the left and right chambers 24a and 24b. Thus, in order to provide the maximum contact surface while the left and right chambers 24a and 24b do not move along different lines but move along almost an identical line, the upper ends of the left and right chambers 24a and 24b are sewn together using the first seam 45.

Figure 5:
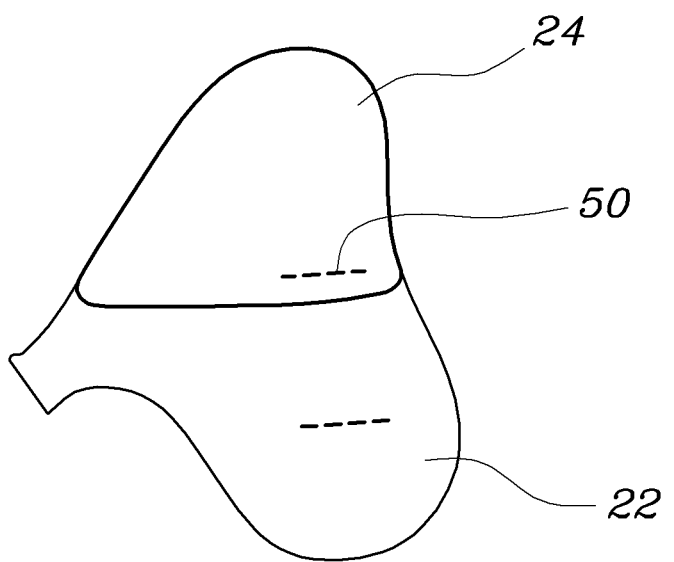
FIG. 5 is a side view showing the center airbag module for the vehicle according to an exemplary embodiment of the present invention.

As shown in FIG. 5, it is preferable that the upper and lower chambers 24 and 22 be separated from each other by a second seam 50. That is, the upper chamber 24 having the head protecting function and the lower chamber 22 having the body protecting function are separated from each other by the second seam 50.

Figure 6:
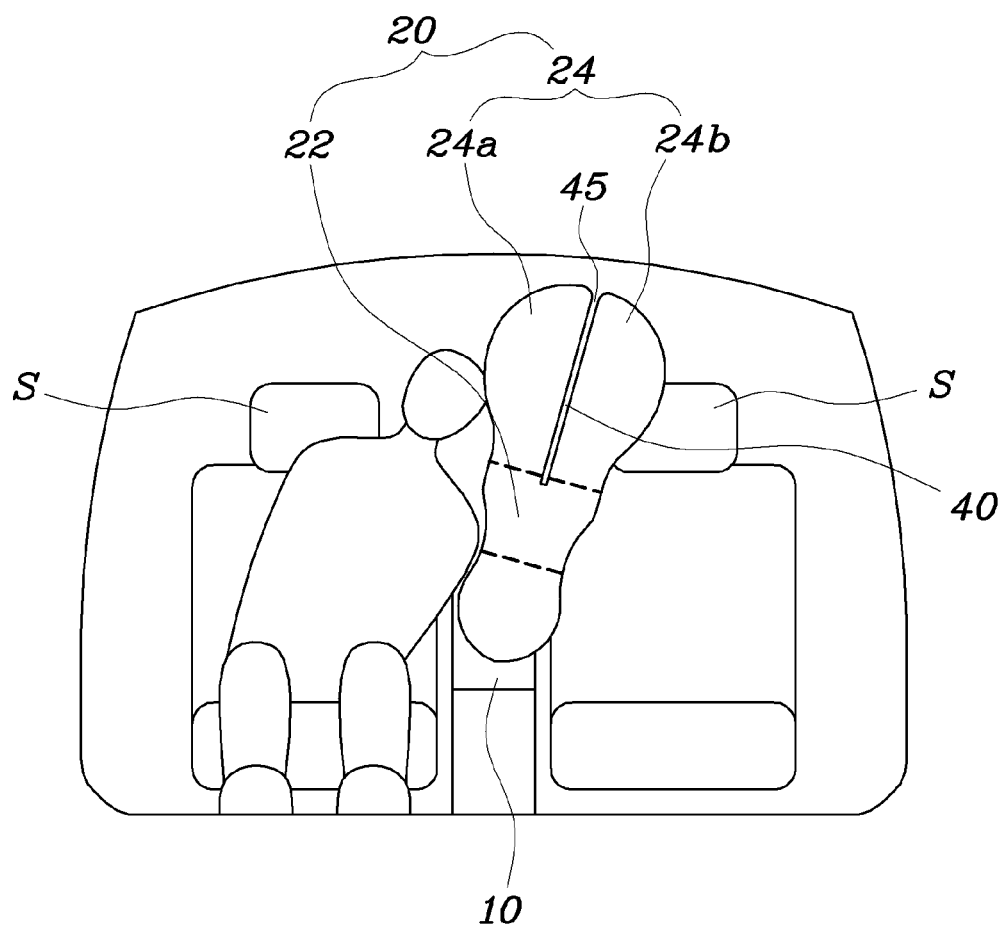
FIG. 6 is a view showing the operation of the center airbag module for the vehicle according to an exemplary embodiment of the present invention.

The operation of the center airbag module for the vehicle according to an exemplary embodiment of the present invention will be described with reference to FIG. 6.

When a side collision occurs, the upper end of the center console 10 opens, and the airbag cushion 20 is deployed. Such an airbag cushion 20 has the structure of 2+1. That is, one lower chamber 22 and the upper chamber 24 including two chambers, namely, the left and right chambers 24a and 24b are deployed.

If the passenger's head moves towards the far side of the vehicle and comes into contact with the left chamber 24a, the entirety of the airbag cushion 20 moves towards the far side of the vehicle. At this time, the right chamber 24b comes into contact with the seat to be supported thereby, so that a primary support force is generated. Further, the left chamber 24a comes into contact with the right chamber 24b to be supported thereby, so that a secondary support force is generated. Thus, the passenger's head is supported in two manners by the airbag cushion 20. Here, the gap 40 between the left and right chambers 24a and 24b functions to absorb shocks transmitted to the passenger's head. Since the left chamber 24a comes into contact with the right chamber 24b after a predetermined time interval and the contact area between the left and right chambers 24a and 24b is at a maximum, the shock absorbing function can also be maximized.

Figure 8:
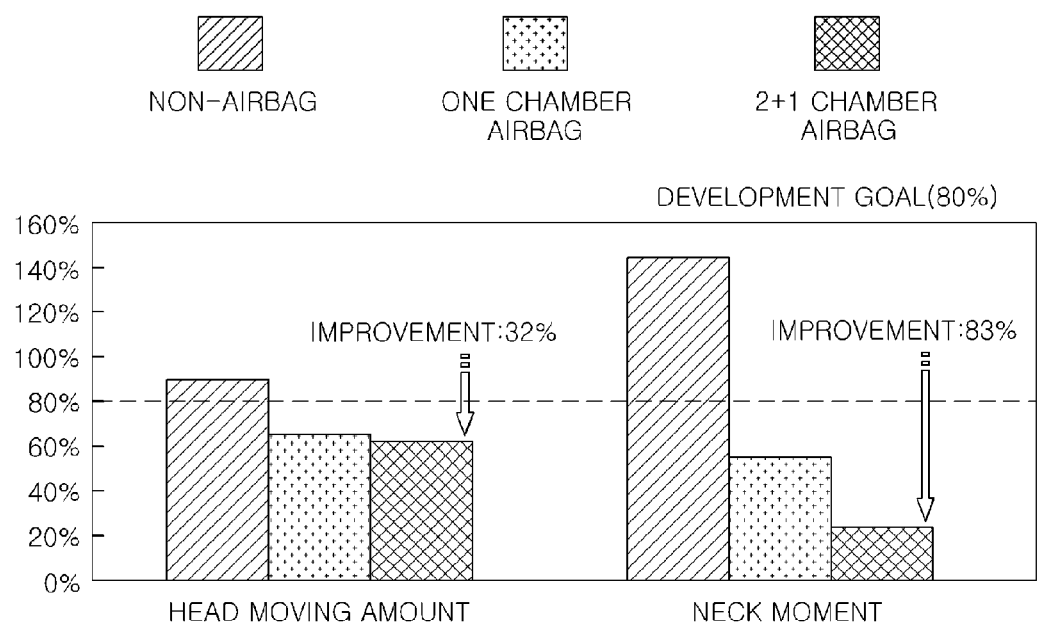
FIG. 8 is a graph showing a head moving amount and a neck moment for the case wherein the center airbag module has not been mounted, the case wherein the airbag cushion of the center airbag module is a one chamber airbag, and the case wherein the center airbag module has a 2+1 chamber structure according to an exemplary embodiment of the present invention.

As shown in FIG. 8, in comparison with the case wherein the center airbag module has not been mounted and the case wherein the airbag cushion of the center airbag module is a one chamber airbag, the center airbag module for the vehicle having the 2+1 chamber structure according to an exemplary embodiment of the present invention improves a head moving amount by 32% from a reference value, and also improves the moment transmitted to the neck by 83%.

Figure 7:
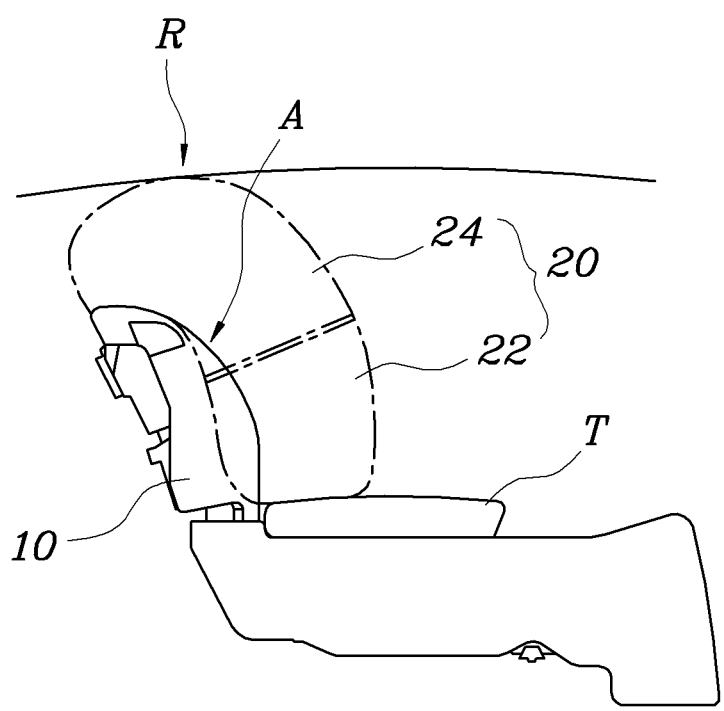
FIG. 7 is a view showing a center airbag module for a vehicle according to another embodiment of the present invention.

Meanwhile, as shown in FIG. 7, a center airbag module for a vehicle according to another embodiment of the present invention includes a center console 10 and an airbag cushion 20. The center console 10 is provided behind an armrest T, and is installed between a pair of seats S, with a surface of the center console 10 being curved. The airbag cushion 20 is fitted between a roof R of the vehicle and the curved surface A of the center console 10 to be subjected to a reaction force in a vertical direction, and functions to support the lateral movement of a passenger. Such an airbag cushion 20 is installed in the center console 10, and deployed in the event of a side collision. The airbag cushion 20 includes a lower chamber 22 that supports a passenger's body, and an upper chamber 24 that extends from the upper end of the lower chamber 22 to protect the passenger's head. Further, the upper chamber 24 preferably includes left and right chambers (see FIG. 4) that branch from the upper end of the lower chamber 22.

According to another embodiment of the present invention, the airbag cushion 20 is fitted between the roof R of the vehicle and the curved surface A of the center console 10 and is subjected to a vertical force, thus supporting a passenger, thereby more efficiently preventing the lateral movement of the passenger.

As described above, the present invention provides a center airbag module for a vehicle, which is constructed to minimize the movement of a passenger towards a far side and an injury to the passenger in the event of a side collision.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center airbag module for a vehicle, comprising:
   a center console provided between a pair of seats; and
   an airbag cushion provided in the center console to be deployed in the event of a side collision, and including:
      a lower chamber configured to support a body of a passenger; and
      an upper chamber including a left chamber and a right chamber which fluid-branch from an upper end of the lower chamber and configured to protect a head of the passenger;
   wherein a predetermined space is formed between the left and right chambers to absorb a shock.

2. The center airbag module as set forth in claim 1, wherein each of the left and right chambers is deployed while being spaced apart from a corresponding seat by a predetermined distance.

3. The center airbag module as set forth in claim 1, wherein a width of the lower chamber is smaller than a width of the upper chamber.

4. The center airbag module as set forth in claim 3, wherein facing inner surfaces of the lower chamber are partially connected to each other by a tether or by sewing to form a fluid communication to the upper chamber.

5. The center airbag module as set forth in claim 1, wherein upper ends of the left and right chambers are connected to each other by sewing along a first seam or by a tether.

6. The center airbag module as set forth in claim 1, wherein the upper and lower chambers are separated from each other by a second seam or a tether.

* * * * *